US009555548B2

United States Patent
Iwatake

(10) Patent No.: US 9,555,548 B2
(45) Date of Patent: Jan. 31, 2017

(54) ROBOT CONTROL DEVICE FOR CONTROLLING ROBOT MOVED ACCORDING TO APPLIED FORCE

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/684,655

(22) Filed: Apr. 13, 2015

(65) Prior Publication Data
US 2015/0290810 A1  Oct. 15, 2015

(30) Foreign Application Priority Data

Apr. 14, 2014 (JP) ................................. 2014-082624

(51) Int. Cl.
*B25J 9/16* (2006.01)

(52) U.S. Cl.
CPC ............. *B25J 9/1694* (2013.01); *B25J 9/1651* (2013.01); *G05B 2219/37357* (2013.01)

(58) Field of Classification Search
CPC ....... B25J 9/1694; B25J 9/1651; B25J 9/1612; B25J 9/1628; B25J 9/1633; B25J 9/1653; B25J 13/02; B25J 13/08–13/081; B25J 13/084–13/085; B25J 9/02; B25J 9/04; G01L 5/22; G05B 2219/37357; G05B 19/416; G05B 19/423; G05B 2219/40408; Y10S 901/0204; Y10S 901/461

USPC .......... 700/258, 250, 253, 257; 901/2–4, 46; 318/568.13, 568.14, 568.16, 568.17, 318/568.18

See application file for complete search history.

(56) References Cited

U.S. PATENT DOCUMENTS

| 4,408,286 A | 10/1983 | Kikuchi et al. | |
| 8,650,965 B2 * | 2/2014 | Hashiguchi | B25J 9/0087 73/763 |
| 2005/0222714 A1 * | 10/2005 | Nihei | G05B 19/423 700/264 |
| 2009/0259412 A1 * | 10/2009 | Brogardh | B25J 9/1633 702/41 |

(Continued)

FOREIGN PATENT DOCUMENTS

| CN | 1460052 A | 12/2003 |
| CN | 1676287 A | 10/2005 |

(Continued)

*Primary Examiner* — Bao Long T Nguyen
(74) *Attorney, Agent, or Firm* — Hauptman Ham, LLP

(57) ABSTRACT

A robot control device includes an operation axis setting unit that sets a axis rotationally moved according to an applied force as an operation axis and sets a rotational moving direction of the operation axis; a first operation force acquisition unit that obtains a first virtual force that is virtually applied to the operation axis to assume that the first virtual force is a first operation force; and an operation command unit that outputs an operation command for moving the operation axis set by the operation axis setting unit on the basis of an operation force determined from the first operation force. The operation command unit obtains a target moving direction and a target moving velocity of the operation axis on the basis of the first operation force and the rotational moving direction set by the operation axis setting unit, so as to move the operation axis.

14 Claims, 6 Drawing Sheets

(56) References Cited

U.S. PATENT DOCUMENTS

| | | | |
|---|---|---|---|
| 2011/0015787 A1* | 1/2011 | Tsusaka | B25J 9/0003 700/264 |
| 2011/0208355 A1* | 8/2011 | Tsusaka | B25J 9/1664 700/246 |
| 2014/0107843 A1* | 4/2014 | Okazaki | B25J 13/085 700/260 |
| 2015/0081098 A1* | 3/2015 | Kogan | B25J 9/1656 700/258 |
| 2015/0323398 A1* | 11/2015 | Lauzier | B25J 9/0081 73/862.08 |

FOREIGN PATENT DOCUMENTS

| | | |
|---|---|---|
| DE | 102007062108 A1 | 7/2009 |
| DE | 102009018403 A1 | 10/2010 |
| DE | 102010019640 A1 | 11/2011 |
| DE | 102010029745 A1 | 12/2011 |
| DE | 102012009010 A1 | 12/2012 |
| JP | 56-85106 A | 7/1981 |
| JP | 06-250728 A | 9/1994 |
| JP | 4267027 B2 | 5/2009 |

* cited by examiner

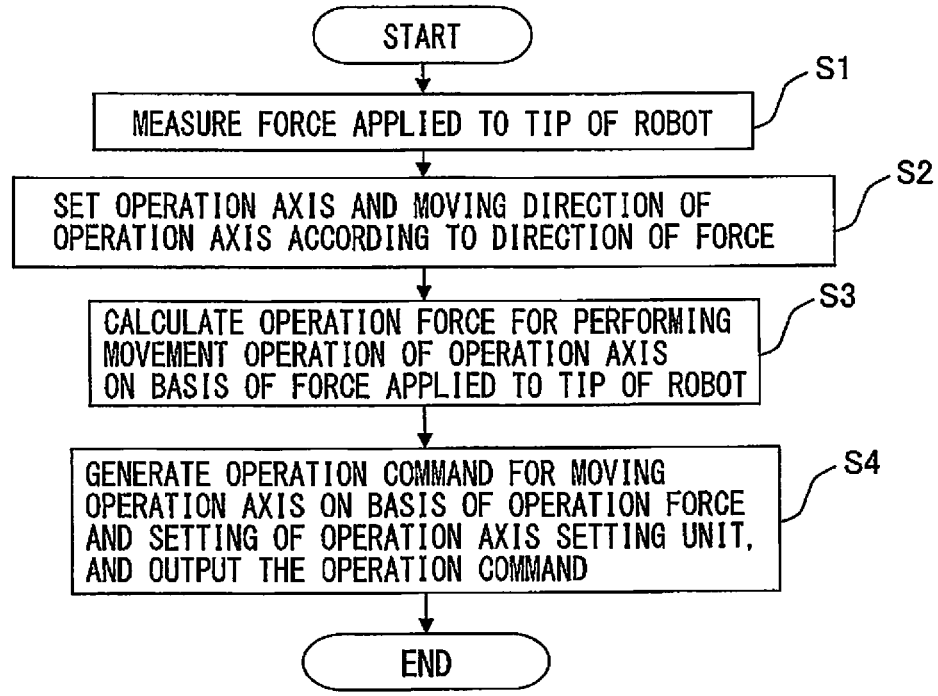
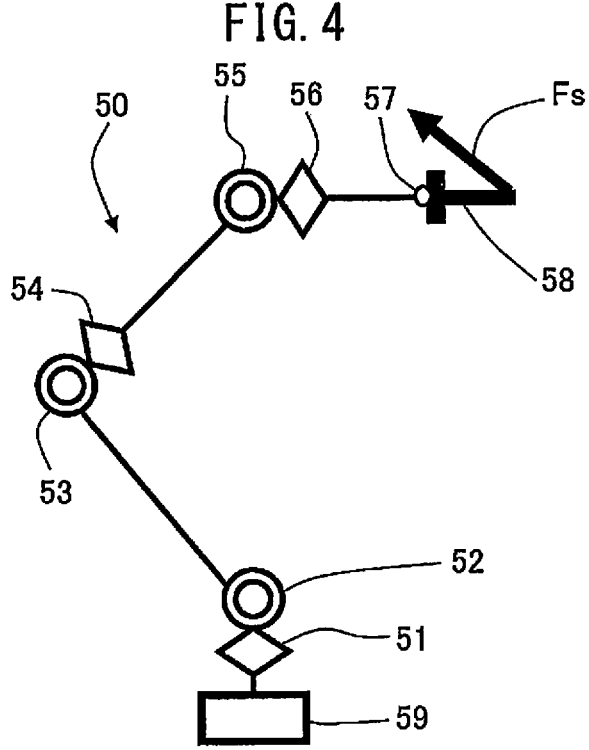

ROBOT CONTROL DEVICE FOR CONTROLLING ROBOT MOVED ACCORDING TO APPLIED FORCE

RELATED APPLICATIONS

The present application claims priority to Japanese Application Number 2014-082624, filed Apr. 14, 2014, the disclosure of which is hereby incorporated by reference herein in its entirety.

BACKGROUND OF THE INVENTION

1. Field of the Invention

The present invention relates to a robot control device for controlling a robot moved according to a force applied to the robot. More particularly, the invention relates to a robot control device of a robot system that moves a robot on the basis of a force applied to the robot including a plurality of axes including at least one rotation axis.

2. Description of the Related Art

Direct teaching is known as a robot operation method for moving a robot by applying a force to the robot or a method for teaching a position by moving the robot. In such a case, force is applied in a direction to which the robot is desired to be moved to directly guide the robot, whereby the robot can be moved to a desired position and/or a desired posture on an orthogonal coordinate system.

Japanese Laid-open Patent Publication No. S56-85106 discloses a method for moving a position and a posture of a tip of a robot arm on the basis of a signal generated by a force detector when operating a manual operation unit of the force detector attached to the tip of the robot arm.

Japanese Laid-open Patent Publication No. H6-250728 discloses a direct teaching device. In this device, a force sensor attached to a robot detects an artificially applied force, and with the use of a signal of the force, a position and a posture of the robot are moved while moving a robot arm only in a specific direction on a Cartesian coordinate system.

In Japanese Laid-open Patent Publication No. 556-85106, the position and/or the posture of the tip of the robot arm on the orthogonal coordinate system is moved according to the force. Due to this, in the method of Japanese Laid-open Patent Publication No. S56-85106, the position of desired each axis cannot be moved during direct teaching.

In Japanese Laid-open Patent Publication No. H6-250728, when moving the robot by direct teaching, the moving direction of the robot is limited to the specific direction to improve operability. The specific direction is a direction associated with the position and/or the posture of the tip of the robot arm on the Cartesian coordinate system. Accordingly, Japanese Laid-open Patent Publication No. H6-250728 does not propose limiting a axis to be driven and the like, such as switching to control of each axis and driving of only a certain desired axis in direct teaching.

The present invention has been accomplished in view of such circumstances. It is an object of the invention to provide a robot control device that, when moving a position and/or a posture of a tip of a robot on an orthogonal coordinate system by moving the robot with application of a force to the tip of the robot arm, allows the tip thereof to be moved to a position to which it is difficult or impossible to move the tip thereof. The invention also further improves operability of such a robot control device.

SUMMARY OF THE INVENTION

In order to achieve the aforementioned object, according to a first aspect of the invention, there is provided a robot control device of a robot system that moves a robot on the basis of a force applied to the robot including a plurality of axes including at least one rotation axis, the robot control device including: a force measurement unit that measures the force applied to a tip of the robot; an operation axis setting unit that sets a axis that is rotationally moved according to the force as an operation axis from among the at least one rotation axis, and sets a rotational moving direction of the operation axis determined according to a direction of the force; a first operation force acquisition unit that, when a force including a translational component of the force measured by the force measurement unit is assumed to be a first tip applied force, obtains, on the basis of the first tip applied force, a force including the translational component of the force present on a plane orthogonal to a rotation center line of the operation axis and applied around the rotation center line of the operation axis, and obtains, on the basis of the obtained force including the translational component of the force and a position vector where the obtained force including the translational component of the force is applied, a first virtual force that is virtually applied to the operation axis to assume that the first virtual force is a first operation force; and an operation command unit that outputs, on the basis of an operation force determined from the first operation force, an operation command for moving the operation axis set by the operation axis setting unit, in which the operation command unit obtains a target moving direction and a target moving velocity of the operation axis on the basis of the first operation force and the moving direction set by the operation axis setting unit, so as to move the operation axis.

According to a second aspect of the invention, there is provided a robot control device of a robot system that moves a robot on the basis of a force applied to the robot including a plurality of axes including at least one rotation axis, the robot control device including: a force measurement unit that measures the force applied to a tip of the robot; an operation axis setting unit that sets a axis that is rotationally moved according to the force as an operation axis from among the at least one rotation axis, and sets a rotational moving direction of the operation axis determined according to a direction of the force; a second operation force acquisition unit that, when a force including a moment component of the force measured by the force measurement unit is assumed to be a second tip applied force, obtains, on the basis on the second tip applied force, a second virtual force that is virtually applied to the operation axis to assume that the second virtual force is a second operation force; and an operation command unit that outputs, on the basis of an operation force determined from the second operation force, an operation command for moving the operation axis set by the operation axis setting unit, in which the operation command unit obtains a target moving direction and a target moving velocity of the operation axis on the basis of the second operation force and the moving direction set by the operation axis setting unit, so as to move the operation axis.

According to a third aspect of the invention, there is provided a robot control device of a robot system that moves a robot on the basis of a force applied to the robot including a plurality of axes including at least one rotation axis, the robot control device including: a force measurement unit that measures the force applied to a tip of the robot; an operation axis setting unit that sets a axis that is rotationally moved according to the force as an operation axis from among the at least one rotation axis, and sets a rotational moving direction of the operation axis determined according to a direction of the force; a first operation force acquisition unit that, when a force including a translational component of the force measured by the force measurement unit is assumed to be a first tip applied force, obtains, on the basis of the first tip applied force, a force including the translational component of the force present on a plane orthogonal to a rotation center line of the operation axis and applied around the rotation center line of the operation axis, and obtains, on the basis of the obtained force including the translational component of the force and a position vector where the obtained force including the translational component of the force is applied, a first virtual force that is virtually applied to the operation axis to assume that the first virtual force is a first operation force; a second operation force acquisition unit that, when a force including a moment component of the force measured by the force measurement unit is assumed to be a second tip applied force, obtains, on the basis on the second tip applied force, a second virtual force that is virtually applied to the operation axis to assume that the second virtual force is a second operation force; and an operation command unit that outputs, on the basis of an operation force determined from the first operation force and the second operation force, an operation command for moving the operation axis set by the operation axis setting unit, in which the operation command unit obtains a target moving direction and a target moving velocity of the operation axis on the basis of the first operation force, the second operation force, and the moving direction set by the operation axis setting unit, so as to move the operation axis.

According to a fourth aspect of the invention, in the first aspect or the third aspect, when the command operation unit obtains the target moving direction and the target moving velocity of the operation axis, the command operation unit obtains a target moving direction and a target tangential velocity of the tip of the robot around the rotation center line of the operation axis, and obtains the target moving direction and the target moving velocity of the operation axis on the basis of the target moving direction and the target tangential velocity of the tip of the robot, so as to move the operation axis.

According to a fifth aspect of the invention, in the second aspect or the third aspect, when the command operation unit obtains the target moving direction and the target moving velocity of the operation axis, the command operation unit obtains a target moving direction and a target tangential velocity of the tip of the robot around a or the rotation center line of the operation axis, and obtains the target moving direction and the target moving velocity of the operation axis on the basis of the target moving direction and the target tangential velocity of the tip of the robot, so as to move the operation axis.

According to a sixth aspect of the invention, in any of the first aspect, the third aspect, and the fourth aspect, the first operation force acquisition unit obtains the force including the translational component of the force that is applied around the rotation center line of the operation axis on the basis of the first tip applied force, and calculates a moment component of the force that is applied around the rotation center line of the operation axis on the basis of the obtained force including the translational component of the force and a position vector where the obtained force including the translational component of the force is applied, so as to obtain a direction and a magnitude of the first operation force.

According to a seventh aspect of the invention, in any of the first aspect, the third aspect, and the fourth aspect, the first operation force acquisition unit obtains the force including the translational component of the force that is applied around the rotation center line of the operation axis on the basis of the first tip applied force, and calculates a moment component of the force that is applied around the rotation center line of the operation axis on the basis of the obtained force including the translational component of the force and a position vector where, on the basis of a position vector where the obtained force including the translational component of the force is applied, a magnitude of the position vector is set to a predetermined value, so as to obtain a direction and a magnitude of the first operation force.

According to an eighth aspect of the invention, in any of the first aspect, the third aspect, and the fourth aspect, the first operation force acquisition unit obtains the force including the translational component of the force that is applied around the rotation center line of the operation axis on the basis of a direction in which the first tip applied force is applied and a rotational operation of direction into a predetermined direction, and calculates a moment component of the force that is applied around the rotation center line of the operation axis on the basis of the obtained force including the translational component of the force and a position vector where the obtained force including the translational component of the force is applied, so as to obtain a direction and a magnitude of the first operation force.

According to a ninth aspect of the invention, in any of the first aspect, the third aspect, and the fourth aspect, the first operation force acquisition unit obtains the force including the translational component of the force that is applied around the rotation center line of the operation axis, which is calculated on the basis of a direction in which the first tip applied force is applied and a rotation operation of direction into a predetermined direction, and calculates a moment component of the force that is applied around the rotation center line of the operation axis, on the basis of the obtained force including the translational component of the force and a position vector where, on the basis of a position vector where the obtained force including the translational component of the force is applied, a magnitude of the position vector is set to a predetermined value, so as to obtain a direction and a magnitude of the first operation force.

According to a tenth aspect of the invention, in any of the first aspect, the third aspect, and the fourth aspect, the first operation force acquisition unit obtains the force including the translational component of the force that is applied around the rotation center line of the operation axis on the basis of the first tip applied force, obtains a direction of the first operation force on the basis of a direction of the obtained force including the translational component of the force and a position vector where the obtained force including the translational component of the force is applied, and obtains a magnitude of the first operation force on the basis of a magnitude of the obtained force including the translational component of the force or a magnitude of the first tip applied force.

According to an eleventh aspect of the invention, in any of the second aspect, the third aspect, and the fifth aspect, the second operation force acquisition unit calculates a moment component of the force that is applied around the rotation center line of the operation axis by the second tip applied force, so as to obtain a direction and a magnitude of the second operation force.

According to a twelfth aspect of the invention, in the seventh aspect or the ninth aspect, the predetermined value is made smaller as a shortest distance from the rotation center line of the operation axis to the tip of the robot becomes larger.

According to a thirteenth aspect of the invention, in the eighth aspect, the predetermined direction is changed to a direction in which an angle made by the predetermined direction and the position vector becomes smaller as a shortest distance from the rotation center line of the operation axis to the tip of the robot becomes larger.

According to a fourteenth aspect of the invention, in any of the first to the thirteenth aspects, the operation command unit obtains a moving velocity of the operation axis by a force control based on a force control gain and makes the force control gain smaller as the shortest distance from the rotation center line of the operation axis to the tip of the robot becomes larger.

The foregoing and other objects, features, and advantages of the present invention will become more apparent from the following detailed description of typical embodiments of the invention illustrated in the accompanying drawings.

BRIEF DESCRIPTION OF THE DRAWINGS

FIG. 3 is a flowchart depicting a process for processing by the robot control device according to the an embodiment of the invention;

FIG. 4 is a diagram depicting a state in which a force Fs is applied to a tip of the robot arm;

DETAILED DESCRIPTION

Figure 1:
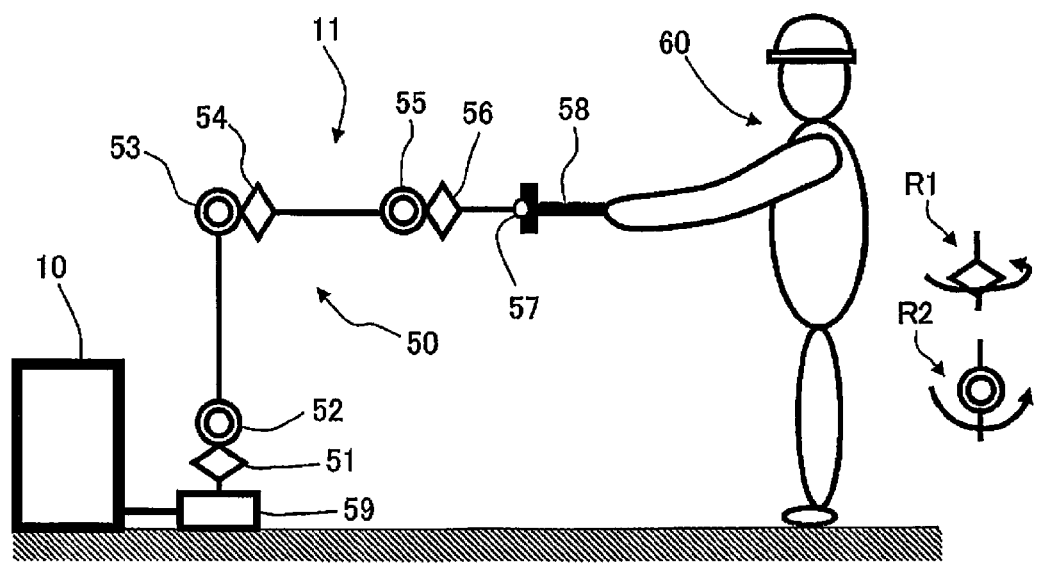
FIG. 1 is a diagram depicting a schematic structure of a robot system provided with a robot controlled by a robot control device according to an embodiment of the present invention.

Hereinafter, exemplary embodiments of the present invention will be described with reference to the accompanying drawings. In the drawings below, the same members are denoted by the same reference numerals. For easier understanding, scales of the drawings are changed as appropriate.

Hereinafter, the term "force" is assumed to include a translational component of a force and a moment component of the force. Additionally, the phase "position and/or posture" is assumed to mean position or posture, or position and posture.

In addition, hereinafter, the term "axis" represents a joint portion connecting links forming a robot to each other, and is assumed to be a portion that changes a positional relationship and an angular relationship between the links. Changing a position of a axis (i.e., changing an angle of a rotation axis) allows changing of the positional relationship between the links, as a result of which the position and/or the posture of a tip of the robot arm can be changed. There may be arranged an actuator for moving a axis position at a portion different from a axis portion.

In addition, a force applied around a rotation center line of a axis of the robot or a force acting around the rotation center line of the axis of the robot is assumed to be, when the axis of the robot is a rotation axis and a coordinate system is set with respect to the axis of the robot in such a manner that an axis of the coordinate system is coincident with the rotation center line of the axis of the robot, a force in a translational direction or a moment of a force applied around the rotation center line of the axis of the robot present on a plane orthogonal to the rotation center line of the axis of the robot on the coordinate system whose origin is an intersection point of the rotation center line of the axis of the robot and the plane.

In the present invention, force control gain means a coefficient for obtaining an amount of movement of the position and/or the posture of the tip of the robot arm, a position of each axis of the robot, and the like on an orthogonal coordinate system at each control cycle on the basis of a magnitude of an applied force in a force control for moving the robot according to the applied force.

FIG. 1 is a schematic diagram depicting a structural example of a robot system 11 provided with a robot 50 controlled by a robot control device 10 according to an embodiment of the present invention. The robot system 11 is provided with the robot control device 10 and the robot 50 in which a position of each axis in each control cycle is controlled by the robot control device 10.

In the robot system 11, when an operator 60 applies a force to a tip 58 of the robot 50, the robot control device 10 controls an actuator for moving each axis of the robot 50 on the basis of the force applied to the tip 58 of the robot 50 measured by a force measurement unit, set data, position data of the robot 50, and the like. In this way, the positions of the axes forming the robot 50 are changed, whereby the robot 50 can be moved.

The robot control device 10 has a hardware structure including a calculation processing unit, a ROM, and a RAM, and executes various functions that will be described later.

The robot 50 controlled by the robot control device 10 according to an embodiment of the present invention includes axes including at least one rotation axis.

The robot 50 depicted in FIG. 1 includes six axes. These six axes are assumed to be set as follows, in order from a side of the robot 50 closer to a base thereof: a first axis is J1 axis 51; a second axis is J2 axis 52; a third axis is J3 axis 53; a fourth axis is J4 axis 54; a fifth axis is J5 axis 55; and a sixth axis is J6 axis 56.

As indicated on the right side of FIG. 1, the J1 axis 51, the J4 axis 54, and the J6 axis 56 are formed as rotation axes R1 rotating around links connecting the axes to each other. Additionally, the J2 axis 52, the J3 axis 53, and the J5 axis 55 are formed as rotation axes R2 rotating around a direction orthogonal to the links connecting the axes to each other.

FIG. 1 is a simple illustrative view for representing a structure of the axes of the robot 50. In addition, when an origin of each axis is assumed to be an origin of a coordinate system set at the each axis and also a point at which the links are connected to each other, a position of the origin of the each axis is assumed to be represented as a position thereof on a coordinate system set in a space. Hereinafter, the coordinate system set in the space is assumed to be a reference coordinate system. Axial origins of the J1 axis 51 and the J2 axis 52 are assumed to be in the same position; origins of the J3 axis 53 and the J4 axis 54 are assumed to be in the same position; and origins of the J5 axis 55 and the J6 axis 56 are assumed to be in the same position.

In the present practical example, when it is described with respect to a axis set as a rotation axis that the position of the axis is moved, the position of the axis is assumed to mean an angle of the rotation axis, and moving the position of the axis is assumed to mean rotating the rotation axis to change the position thereof. Additionally, when referring to the position of the origin of a axis, it is assumed to represent a position of the origin of the coordinate system set at each axis on the coordinate system set with respect to the space. Furthermore, the coordinate system set with respect to the space is assumed to be a coordinate system for representing positions and/or postures of the tip 58 of the robot 50, a flange 57 used for attaching the tip 58 to the robot 50, the coordinate system set at each axis, and the like, on an orthogonal coordinate system fixed with respect to the space.

In addition, a coordinate system set with respect to the robot 50 in order to represent a position and/or a posture of the robot 50 on the reference coordinate system set with respect to the space is assumed to be a tool coordinate system. The origin of the tool coordinate system, which is a point that is translationally moved or a center point of rotational movement, is assumed to be a control point. A coordinate system in which a coordinate system parallel to the reference coordinate system is set at the control point is assumed to be a control coordinate system. The position of the control point can be an arbitrary position as long as it is a position set with respect to the robot 50.

In the present practical example, all of the six axes of the robot 50 are assumed to be rotation axes. However, the robot 50 may include a linear motion axis. In addition, the robot 50 is a vertical multi-joint robot having the six axes. However, the robot 50 can be an arbitrary known robot having any other configuration as long as it is a robot that includes one or more rotation axes and allows control of the position of each axis and control of orthogonal position.

The tip 58 of the robot 50 is a portion with an object attached to the flange 57 of the robot 50. A six-axis force sensor is attached to the tip 58 of the robot 50, although not depicted in the drawing. The robot control device 10 causes a force measurement unit 21, which will be described later, to measure a force applied to the tip 58 of the robot 50 by the operator 60 on the basis of an output of the force sensor detected at each predetermined time interval.

The force measurement unit 21 sets a coordinate system having the origin at a point where the force at the tip 58 of the robot 50 is measured. Then, the force measurement unit 21 measures, as the force applied to the tip 58 of the robot 50, a translational component F of the force and a moment component M of the force on the coordinate system. Hereinafter, the coordinate system is assumed to be a force measurement coordinate system, and the origin of the coordinate system is assumed to be a force measurement point. In this case, translational components of the force on an X axis, a Y axis, and a Z axis, respectively, of the coordinate system set at the tip 58 of the robot 50 are represented as Fx, Fy, and Fz, respectively, and moment components of the force detected around the X axis, the Y axis, and the Z axis, respectively, are represented as Mx, My, and Mz, respectively.

The force measurement point may be a force applied point where the operator applies a force, an origin of a sensor coordinate system set at the force sensor, an axial point of the sensor coordinate system, or the like. In the present practical example, six components of the force are measured. However, only the translational component F of the force or only the moment component M of the force may be measured. In addition, a force sensor attachment position may be an arbitrary position as long as a force applied to the tip 58 of the robot 50 can be measured. In addition, the force measurement unit for measuring a force applied to the tip 58 of the robot 50 may be a force sensor having three axes, instead of a force sensor having six axes.

In addition, the force measurement unit 21 may estimate the force applied to the tip 58 of the robot 50 on the basis of an electric current value where the actuator for moving the axes forming the robot 50 is a motor, a deviation between a commanded position of each axis and an actual position thereof, an output of a torque sensor attached to each axis, or the like.

To the tip 58 of the robot 50 are attached a tool for performing tasks including processing of a workpiece and carrying of the workpiece, a maneuvering device for performing a movement operation according to the force, and the like.

The tool and the maneuvering device may be attached to the force sensor attached to the robot 50. Alternatively, the force sensor may be attached to the tool attached to the robot 50, and the maneuvering device may be attached to a tip side of the force sensor.

When applying a force to the tip 58 of the robot 50, the force may be applied to the tool attached to the force sensor without using the maneuvering device. Alternatively, the force may be applied to the maneuvering device attached to the force sensor.

When an operator applies a force to the tool or the maneuvering device attached to the force sensor to move the robot 50, the force measurement unit 21 compensates, as needed, for an influence of the tool br the maneuvering device attached to the force sensor or a gripped object such as a workpiece on the force detected by the force sensor due to gravity, inertia force (including Coriolis force and Gyroscopic precession), and the like. In this way, the force measurement unit 21 can measure a net force applied to the tip 58 of the robot 50 by the operator.

When a device as a combination of the force sensor and the maneuvering device is attached to the tool attached to the tip 58 of the robot 50, an influence of the object attached to the force sensor on the force sensor due to the gravity and inertia force becomes small. Accordingly, in this case, an error in obtaining the net force also becomes small.

In addition, the device as the combination of the force sensor and the maneuvering device may be attached to the tool by using a magnet, a spring, or the like. In this case, such a device can be easily detached. In addition, it is also possible to attach such a device only when moving the robot 50 by application of a force. Thus, the device can be detached when teaching operation is unnecessary, or it is possible to use such a device in another robot system, as needed.

Figure 2:
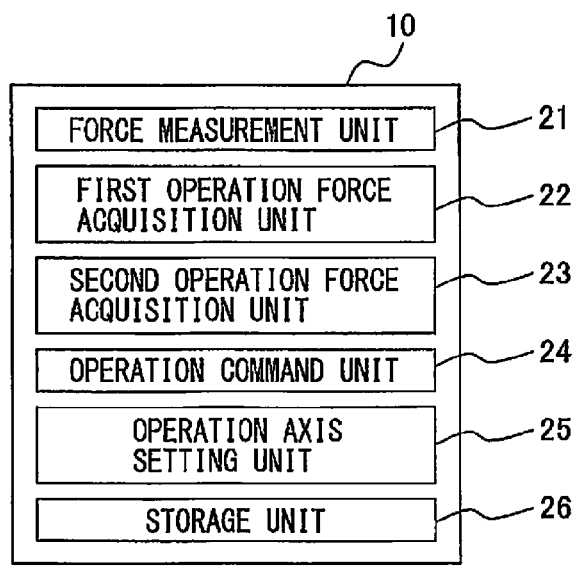
FIG. 2 is a diagram functionally depicting a structure of the robot control device according to the an embodiment of the invention.

FIG. 2 is a diagram functionally depicting a structure of the robot control device 10 according to the an embodiment of the invention. As depicted in FIG. 2, the robot control device 10 includes the force measurement unit 21 described above, a first operation force acquisition unit 22, a second operation force acquisition unit 23, an operation command unit 24, an operation axis setting unit 25, and a storage unit 26.

The operation axis setting unit 25 sets, as an operation axis, a axis rotationally moved according to force from among at least one rotation axis forming the robot 50, and also sets a rotational moving direction of the operation axis determined according to a direction of the force. The setting of the operation axis and the rotational moving direction of the operation axis determined according to the direction of the force are set on the basis of settings stored in the storage unit 26 of the robot control device 10.

Additionally, according to an input by an input device (not shown) connected to the robot control device 10, the operation axis may be changed or the rotational moving direction of the operation axis determined according to the direction of the force may be changed. Additionally, according to the situations of movement operation, such as the position of each axis of the robot 50 and the force applied to the tip of the robot 50, a axis set as the operation axis may be changed or the rotational moving direction of the operation axis determined according to the direction of the force may be changed.

The force measurement unit 21 measures a net force applied to the tip 58 of the robot 50 by the operator 60. As described above; the force measurement unit 21 compensates, as needed, for an influence that the tool or the maneuvering device attached to the tip 58 of the robot 50 or a gripped object such as a workpiece has due to gravity, inertia force (including Coriolis force or Gyroscopic precession), and the like.

The compensation for the influence of the gravity and inertia force caused by the object attached to the force sensor is performed by a known method as follows. Before the operator applies a force to the object attached to the force sensor, a mass and a center of gravity of the object are calculated in advance. Then, the calculated mass and center of gravity, and a moving motion of the robot are referred to, and a known method, such as a technique disclosed in Japanese Patent No. 4267027, is used for calculation.

A force including a translational component of a force applied to the tip 58 of the robot 50 and measured by the force measurement unit 21 is assumed to be a first tip applied force. Additionally, a force including a moment component of the force that is applied to the tip 58 of the robot 50 is assumed to be a second tip applied force.

The first operation force acquisition unit 22 acquires, on the basis of the force measured by the force measurement unit 21, an operation force used when the operation command unit 24 described later generates an operation command of a position of each axis of the robot 50 at each control cycle.

At this time, the first operation force acquisition unit 22 obtains, on the basis of the first tip applied force measured by the force measurement unit 21, the force including the translational component of the force present on a plane orthogonal to a rotation center line of an operation axis and applied around the rotation center line of the operation axis, and obtains a first virtual force virtually applied to the operation axis on the basis of the obtained force including the translational component of the force and a position vector where the obtained force including the translational component of the force is applied. Then, the first operation force acquisition unit 22 acquires a first operation force by assuming the first virtual force to be the first operation force.

The second operation force acquisition unit 23 acquires, on the basis of the force measured by the force measurement unit 21, an operation force used when the operation command unit 24 described later generates an operation command of a position of each axis of the robot 50 at each control cycle.

At this time, the second operation force acquisition unit 23 obtains a second virtual force virtually applied to the operation axis, on the basis of the second tip applied force. Then, the second operation force acquisition unit 23 acquires a second operation force by assuming the second virtual force to be the second operation force.

In this case, the second operation force acquisition unit 23 preferably obtains a direction and a magnitude of the second operation force by calculating a moment component of a force applied around the rotation center line of the operation axis by the second tip applied force.

Each of the first and the second operation forces acquired by the first operation force acquisition unit 22 and the second operation force acquisition unit 23 is obtained as follows.

The operation force is calculated on the basis of an actual force applied to the tip 58 of the robot 50 measured by the force measurement unit 21. Alternatively, on the basis of the force applied to the tip 58 of the robot 50, a virtual force that is a force regarded as being virtually applied to a axis to be moved, is calculated as the operation force.

Specifically, the operation force will be calculated as follows.

When a translational force applied to the tip 58 of the robot 50 is projected, with respect to a axis to be moved, on a plane orthogonal to the rotation center line of the axis, a direction of the operation force for moving the axis is obtained on the basis of whether the force is oriented in a positive rotation direction or a negative rotation direction with respect to the axis, i.e., on the basis of a direction of the translational force acting around the rotation center line of the axis. Then, a magnitude of the operation force is obtained on the basis of a magnitude of the translational force measured by the force measurement unit 21, a magnitude of the projected force, or a magnitude of a component of the projected force orthogonal to a position vector from the rotation center line to a point at which the projected force is applied.

In addition, on the basis of the force applied to the tip 58 of the robot 50 measured by the force measurement unit 21, a moment of the force around the rotation center line with respect to the axis to be moved may be calculated to obtain the operation force.

In addition, when calculating the moment of the force around the rotation center line with respect to the axis to be moved on the basis of the force applied to the tip 58 of the robot 50 measured by the force measurement unit 21, the moment may be calculated by devising a method for calculating a force vector or a position vector as appropriate so that operability is improved, thereby obtaining the operation force.

In addition, the direction of the operation force for moving the axis may be determined on the basis of a positive/negative sign of the moment of the force applied, with respect to the axis to be moved, around the rotation center line of the axis. In addition, a magnitude of the operation force appropriate according to operation may be obtained on the basis of the magnitude of the force measured by the force measurement unit 21.

The method for determining the direction of the operation force can be any method as long as it is a method for determining a forward direction or a reverse direction, such as a direction or a positive/negative sign that can determine a moving direction of a axis to be moved.

In addition, in order to improve operability of the robot when moving a axis according to the force, the operation force is preferably adjusted considering a moving direction, a moving velocity, and the like of the robot during operation, as needed.

The present practical example has described the case of the operation axis as a rotation axis. When the operation axis is a linear motion axis, a translational component of force in the direction of the axis is calculated.

On the basis of an operation axis and a moving direction of the operation axis set by the operation axis setting unit 25 in order to move the robot 50 on the basis of a force applied to the tip 58 of the robot 50 and operation forces (a first operation force and/or a second operation force) calculated by the first operation force acquisition unit 22 and/or the second operation force acquisition unit 23, the operation command unit 24 obtains a target moving direction and a target moving velocity of the operation axis, and outputs an operation command for moving the operation axis at each control cycle. When generating the operation command on the basis of the operation force, force control gain may be used to obtain a moving velocity with respect to the operation force. Additionally, depending on the situation during operation, moving velocity is preferably adjusted as needed by reducing responsiveness to the operation force, accelerating, or decelerating.

The storage unit 26 stores parameters necessary for various calculations and calculation results, such as a parameter that the force measurement unit 21 needs to calculate a force, a parameter that each of the first operation force acquisition unit 22 and the second operation force acquisition unit 23 needs to calculate an operation force, a parameter that the operation axis setting unit 25 needs to set an operation axis, and setting results.

Furthermore, although not depicted in the drawing, the robot control device 10 includes a calculation unit or the like that calculates a position of each axis of the robot 50, a position and/or a posture of the tip thereof, velocity, and acceleration on the basis of information from a position detector such as an encoder attached to each axis of the robot 50.

Furthermore, although not depicted in the drawing, the robot control device 10 includes an input unit that receives and processes input data such as data transferred by connecting an input device capable of inputting various settings to the robot control device 10 and data of a setting input by another control device or a computer and transferred to the robot control device 10 via a network.

Next, with reference to FIG. 3, a description will be given of an example of a process for processing by the robot control device 10 according to the an embodiment of the invention when the operator 60 applies a force to the tip 58 of the robot 50 to move the robot 50. FIG. 3 is a flowchart depicting an example of the process for processing by the robot control device 10. The following will be a description of processing executed by the robot control device 10 when moving the robot 50 by applying a force to the tip 5B of the robot 50, with reference to the flowchart of FIG. 3 and the relevant drawings. The series of processing illustrated below is merely an example and it is to be noted that the present invention is not limited to the specific example.

First, the force measurement unit 21 measures a force applied to the tip 58 of the robot 50 by the operator 60 (step S1).

Next, the operation axis setting unit 25 sets an operation axis to be moved according to the force, and also sets a moving direction of the operation axis determined according to a direction of the force (step S2).

Next, on the basis of the force applied to the tip 58 of the robot 50 measured by the force measurement unit 21, the first operation force acquisition unit 22 and/or the second operation force acquisition unit 23 calculate(s) an operation force (a first operation force and/or a second operation force) for moving a position of the operation axis set by the operation axis setting unit 25 (step S3).

Next, the operation command unit 24 generates an operation command for moving the position of the operation axis on the basis of the operation force(s) calculated by the first operation force acquisition unit 22 and/or the second operation force acquisition unit 23 and the setting of the operation axis setting unit 25, and outputs the operation command (step S4).

A practical example of processing for moving the position of the operation axis will be further described. In the step S2, it is assumed that the operation axis setting unit 25 sets an operation axis to be moved and sets the moving direction of the operation axis determined according to a direction of the force to the same direction as that of the force.

This case will be described in detail regarding a method for calculating an operation force for moving the position of the operation axis by the first operation force acquisition unit 22 and/or the second operation force acquisition unit 23 in the step S3 and a method for generating an operation command for the movement by an operation command unit in the step S4. When the axis set as the operation axis is different or depending on the situation of movement operation, a different calculation method may be used.

FIG. 4 is a diagram indicating that a force Fs applied to the tip 58 of the robot 50 is measured by the force measurement unit 21. The force Fs is assumed to include a translational component F of the force and a moment component M of the force, and force that includes translational components Fx, Fy, and Fz of the force and moment components Mx, My, and Mz of the force.

Hereinafter, a processing in which the first operation force acquisition unit 22 acquires the first operation force corresponds to a processing for calculating an operation force on the basis of the translational components F of force (Fx, Fy, and Fz) of the force Fs. In addition, a processing in which the second operation force acquisition unit 23 acquires the second operation force corresponds to a processing for calculating an operation force on the basis of the moment components M of force (Mx, My, and Mz) of the force Fs.

The first operation force acquisition unit 22 and/or the second operation force acquisition unit 23 obtains a first operation force and/or a second operation force on the basis of the force Fs. Each of the first and the second operation forces is used as an operation force. Alternatively, the operation force may be calculated on the basis of each of the first and the second operation forces. In such a case, it is possible to multiply each of the first and the second operation forces by a predetermined coefficient or different coefficients.

When setting a coordinate system with respect to an operation axis, the coordinate system is set in such a manner that a rotation center line of the operation axis is coincident with a Z axis of the coordinate system. The operation force may be a moment of a force around the Z axis in a force calculated by coordinate-converting the Fs measured by the force measurement unit 21 into a force on the coordinate system set at the operation axis.

Alternatively, the operation force may be obtained as below.

Figure 5:
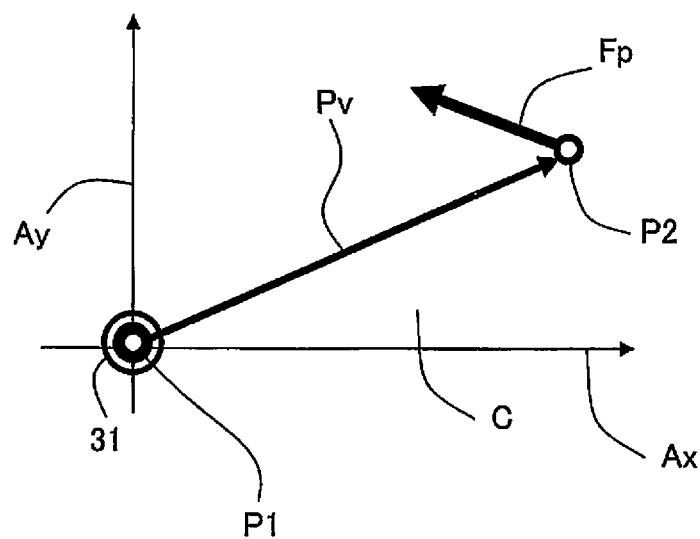
FIG. 5 is a diagram for illustrating a method for calculating an operation force with respect to an operation axis depicted in FIG. 4.

FIG. 5 is a diagram for illustrating a method for calculating an operation force with respect to an operation axis 31 on the basis of the operation axis 31 and the force Fs measured by the force measurement unit 21 depicted in FIG. 4.

A coordinate system including a point P1, an X axis Ax, a Y axis Ay, and a Z axis Az is set with respect to the operation axis 31 such that the P1 representing a position of the operation axis 31 on a reference coordinate system is the origin of the coordinate system; the Z axis Az is coincident with a rotation center line of the operation axis 31; and a plane formed by the X axis Ax and the Y axis Ay is a plane orthogonal to the rotation center line of the operation axis 31. A plane C is the plane formed by the X axis and the Y axis Ay on the coordinate system set with respect to the operation axis 31 and is assumed to be an X-Y plane. Additionally, the plane C may be a plane orthogonal to the rotation center line of the operation axis 31. In this case, the point P1 is an intersection point of the plane and the rotation center line. In addition, a point P2 is assumed to be a point where a force measurement point as the origin of a force measurement coordinate system used when measuring a force applied to the tip 58 of the robot 50 is projected on the plane C.

A moment of the force obtained by coordinate-converting the moment component force M (Mx, My, Mz) of the force Fs measured by the force measurement unit 21 into a moment of the force on the plane C is assumed to be a moment M21 of the force. Alternatively, the moment M21 of the force may be a moment of the force around the Z axis Az obtained by coordinate-converting the moment component force M thereof into a moment of the force on the coordinate system set at the operation axis 31.

A position vector Pv is a position vector from the P1 to the point P2 on the plane C. A magnitude of the position vector Pv in this case is a shortest distance between the rotation center line of the operation axis 31 and the force measurement point.

A force Fp is a translational force obtained as a force applied around the rotation center line of the operation axis 31 on the plane C on the basis of the translational component force F (Fx, Fy, Fz) of the force Fs measured by the force measurement unit 21. The translational force obtained by projecting the translational component force F on the place C may be assumed to be force Fp. In addition, when obtaining the force Fp on the basis of the translational component force F of the force Fs, the force Fp may be calculated on the basis of a direction in which he translational component force F of the force Fs is applied and a rotation operation of direction into a predetermined direction.

Figure 6:
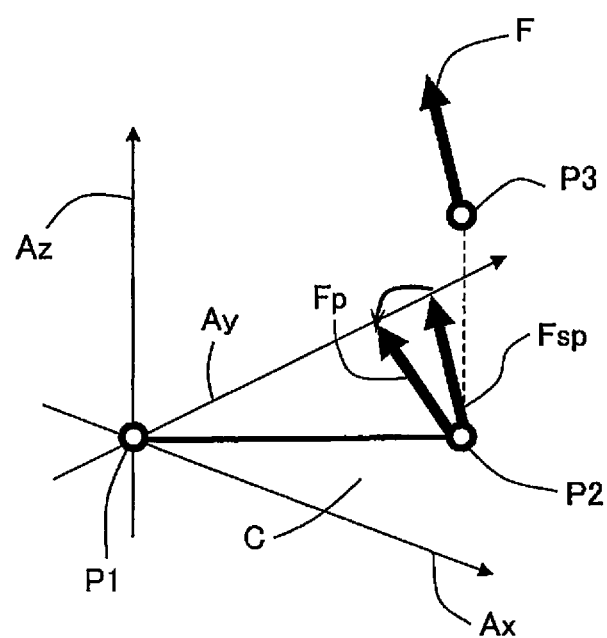
FIG. 6 is a diagram depicting an example of a method for calculating a force Fp.

With reference to FIG. 6, a description will be given of an example of a method for calculating the force Fp for reducing fluctuation of the magnitude of the force Fp obtained by the force F due to fluctuation in the direction of the force F of the translational component of the force Fs. On the coordinate system at the operation axis 31, a force obtained by moving in parallel a force F applied at a force measurement point P3 so as to be applied at the point P2 on the plane C where a value of the force measurement point P3 in the Z axis Az direction is set to 0 is assumed to force Fsp. When an angle made by the force Fsp and the plane C is smaller than a predetermined threshold value, the force Fsp is rotated around the point P2 as a rotation center point in a direction closest to the plane C to use as a force on the plane C, thereby obtaining the force Fp.

When the angle made by the force Fsp and the plane C is large and the direction of the force Fsp is close to a direction orthogonal to the plane C, the above method inappropriately makes the force large and thus is not performed. When the angle made by the force Fsp and the plane C is equal to or larger than the predetermined threshold value, the force F of the transitional component of the force Fs or the force Fsp is projected on the plane C to obtain the force Fp, or alternatively, it is assumed that the magnitude of the force Fp is 0 and any operation force by the force F of the transitional component of the force Fs is not applied.

In addition, when an angle made by the force F of the transitional component of the force Fs and a plane parallel to the plane C is smaller than a predetermined threshold value, a vector obtained by projecting the force F on the place C and additionally performing expansion/contraction adjustment of a vector of the projection such that a magnitude of the vector becomes a magnitude of the force F may be assumed to be the force Fp.

Furthermore, when the angle made by the force F of the transitional component of the force Fs and the plane parallel to the plane C is equal to or larger than the predetermined threshold value, the force F may be projected on the plane C to obtain the force Fp, or alternatively, it may be assumed that the magnitude of the force Fp is 0 and any operation force by the force F of the transitional component of the force Fs is not applied.

As described above, it is possible to reduce fluctuation in the magnitude of the farce Fp due to fluctuation in the direction of the force F or adjust the magnitude of the force Fp by obtaining the force Fp on the plane C on the basis of the direction in which the force F of the translational component of the force Fs is applied and the rotation operation of direction into a predetermined direction, as compared to when only projecting the force F on the plane C.

Additionally, with reference to FIG. 7, a description will be given of another example of the force Fp calculation method for reducing fluctuation of the magnitude of the force Fp obtained by the force F due to fluctuation in the direction of the force F of the translational direction component of the force Fs.

Figure 7:
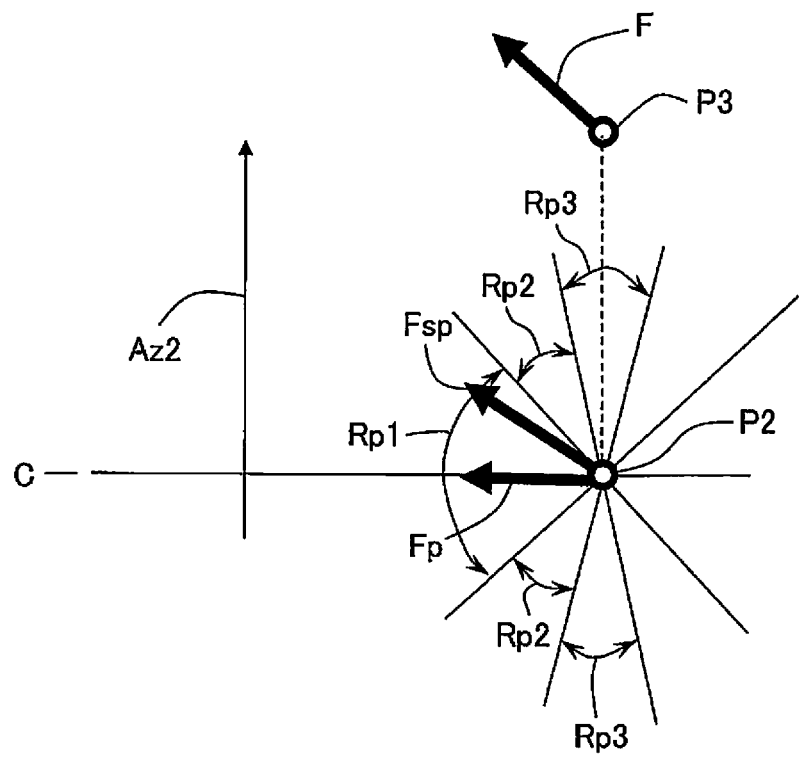
FIG. 7 is a diagram depicting another example of the method for calculating the force Fp.

A plane depicted in FIG. 7 indicates a plane including a vector obtained when a force F of a translational direction component of the Fs is projected on the plane C, orthogonal to the plane C, and including a axis Az2. The axis Az2 is assumed to be a axis parallel to the Z axis Az. The force Fsp is assumed to be a force moved in parallel on the coordinate system set with respect to the operation axis 31 such that the force F applied at the force measurement point P3 is applied at the point P2 on the plane C where the value of the force measurement point P3 in the Z axis Az direction is 0. An angle made by the force Fsp and the plane C is compared with predetermined ranges Rp1, Rpt, and Rp3 determined in order by a predetermined angle to obtain which of the predetermined ranges includes the direction of the force Fsp. Based on the range including the direction of the force Fsp, a predetermined angle set in each predetermined range is obtained to obtain a direction that forms the angle with respect to the plane C. In other words, a representative direction determined according to the direction of the force is obtained. Then, the Fsp is rotated around the point P2 as the rotation center point so that the direction of the force becomes the obtained direction. The force thus obtained is projected on the plane C, and the calculated vector is assumed to be a force Fp.

For example, when the direction of the force Fsp is within the range Rp1, a direction in which the force Fsp is rotationally moved is assumed to be a direction in which the angle made by the force Fsp and the plane C is 0 degrees. When the direction of the force Fsp is within the range Rp3, the direction of the force Fsp is close to a direction orthogonal to the plane C. In such a case, the direction in which the force Fsp is rotationally moved is assumed to be a direction orthogonal to the plane C. Alternatively, it is assumed that the magnitude of the force Fp is 0 and any operation force by the force F of the translational direction component of the force Fs is not applied.

When switching the direction of the force Fsp depending on the predetermined range as mentioned above, it is preferable to smoothly change the direction of the force Fsp or the magnitude of the force Fp obtained by projecting the force Fsp so that the operation force does not significantly change.

With respect to the force Fp on the plane C thus obtained, a force Fn, as will be described later, obtained on the basis of a rotation operation of direction into a predetermined direction, a parallel movement operation, an operation of changing the magnitude of the force Fp, and the like, may be assumed to be a new force Fp.

Then, an operation force is obtained on the basis of a moment M11 of the force obtained by an outer product calculation of the force Fp on the plane C and the position vector Pv and a moment M21 of the force.

When the magnitude of the position vector Pv is smaller than a predetermined value, the moment of force M21 is assumed to be an operation force. This has the following effect. When the point P2 is close to the point P1, and, depending on an error of the point P2, the point P2 is in a different position from an actual position thereof or the position thereof fluctuates, the sign of the moment of force can be opposite. In such a case, when the value of a force control gain with respect to the operation force is large or when a moment of force is calculated by multiplying each of the moment of force M11 and the moment of force M21 by a coefficient and adding them together, and when the coefficient by which the moment of force M11 is multiplied is large, it can be prevented that the operation axis is moved in an unintentional direction.

When the magnitude of the position vector Pv is equal to or larger than the predetermined value, a moment of force is calculated from the outer product calculation of the position vector Pv and the force Fp, and the calculated moment of force M11 is assumed to be an operation force. Alternatively, a moment of force obtained by adding the calculated moment of force M11 and the moment of force M21 together is assumed to be an operation force. Furthermore, values obtained by multiplying each of the moments of force M11 and M21 by a coefficient to change the magnitude thereof to adjust an influence of each moment of force may be added together. In this case, the coefficient may be adjusted on the basis of the magnitude of the position vector Pv, the magnitude of the force Fp, and the like.

When it is desirable to remove the influence of the force M of the moment component of force of the force Fs measured by the force measurement unit 21 or it is desirable to move the operation axis only by the translational force of the force Fs, only the moment of force M11 is preferably assumed to be the operation force, without considering the moment of force M21.

Additionally, even if the magnitude of the force Fp is the same, the magnitude of the calculated moment of force M11 varies depending on the magnitude of the position vector Pv. For this reason, unlike the moment of force M21, the magnitude of the moment of force M11 varies depending on the positional movement of the tip 58 of the robot 50, and thus the operation force fluctuates.

Accordingly, when the magnitude of the position vector Pv is equal to or larger than the predetermined threshold value and the magnitude of the force Fp is smaller than a predetermined threshold, only the moment of force M21 may preferably be assumed to be the operation force. The description regarding the moment of force M21 hereinabove will be similarly applied to other cases when considering the moment of force M21.

When calculating a moment of force as described above, even if the magnitude of the force Fp is the same, there is a problem resulting from change in the magnitude of the calculated moment of force M11 caused depending on the magnitude of the position vector Pv. A method for solving the problem will be described with reference to FIG. 8.

Figure 8:
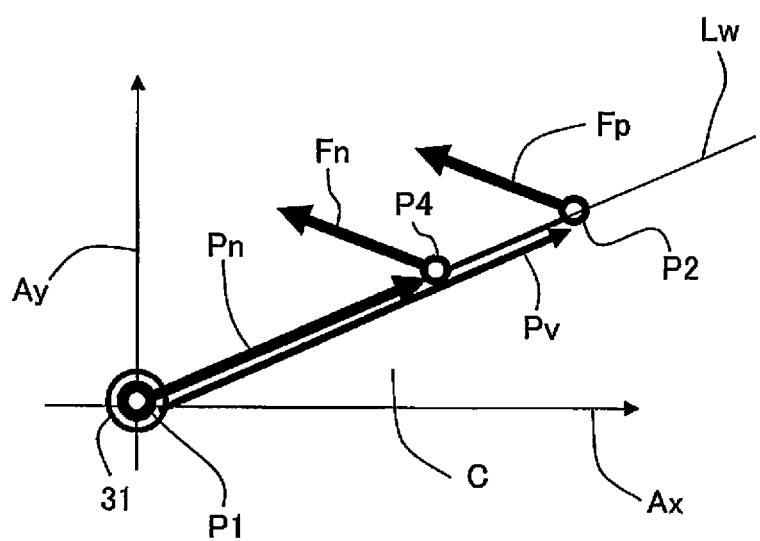
FIG. 8 is a diagram for illustrating another method for calculating an operation force with respect to the operation axis.

FIG. 8 is a diagram for illustrating another method for calculating an operation force with respect to the operation axis 31 on the basis of the force Fs measured by the force measurement unit 21 described as above. A straight line Lw is assumed to be a straight line present on the plane C and including the point P1 and the point P2. A position vector Pn is calculated by an expansion/contraction adjustment of the magnitude of the position vector Pv to a predetermined value Cpn on the basis of the position vector Pv where the force Fp including a translational force on the place C is applied. A force obtained by moving the force Fp in parallel so as to be applied at a position P4 as an end point of the position vector Pn is assumed to be a force Fn.

A moment of force is calculated from an outer product calculation of the position vector Pn and the force Fn thus obtained, and the calculated moment of force M12 is assumed to be the operation force.

As described above, when obtaining a moment of force, the expansion/contraction adjustment of the position vector allows the reduction of fluctuation in the moment of force due to fluctuation in the position of the point P2, so that small fluctuation, radical change, and the like in the operation force can be prevented. Thus, the robot 50 can be stably moved and therefore operability can be improved.

In addition, when obtaining a moving velocity of the operation axis on the basis of an operation force and a force control gain, it can be prevented that even if the same force is applied, the moving velocity of the operation axis unintentionally varies depending on the position of the tip 58 of the robot 50.

In addition, in FIG. 8, the predetermined value Cpn used for setting the magnitude of the position vector Pv to a predetermined magnitude may be changed on the basis of the magnitude of the position vector Pv.

Specifically, the predetermined value Cpn is changed with respect to the magnitude of the position vector Pv in stages in each predetermined range. In this case, when switching the value in stages, it is preferable to smoothly change the predetermined value Cpn or smoothly change the calculated moment of force M12 in such a manner that the operation force does not significantly change.

As described above, since the predetermined value Cpn is changed in stages in each predetermined range, it can be prevented that the moment of force fluctuates due to a small positional fluctuation within the predetermined range. This allows the moment of force M12 to change according to the magnitude of the position vector Pv even when the magnitude of the force Fn is the same. Furthermore, fluctuation in the operation force can be reduced, which allows the robot 50 to be moved more stably and more safely, thereby improving operability.

Alternatively, as the magnitude of the position vector Pv becomes larger, the predetermined value Cpn may be made smaller. In this case, as the magnitude of the position vector Pv increases, the predetermined value Cpn is reduced in stages in each predetermined range or in stages according to a predetermined function. At this time, when switching the predetermined value Cpn in stages, it is preferable to smoothly change the value of the predetermined value Cpn in such a manner that the operation force does not significantly change.

As described above, making the predetermined value Cpn smaller along with the increase of the magnitude of the position vector Pv allows the magnitude of the moment of force M12 to be made small even when the magnitude of the force Fn is the same, whereby the operation force can be made small. In this way, when obtaining the moving velocity of the operation axis on the basis of operation force and force control gain, the moving velocity of the operation axis can be made small when the magnitude of the force Fp is the same but the tip 58 of the robot 50 is distal from the operation axis. The operator can move the robot 50 more safely by moving the tip 58 of the robot 50 in a state where the moving velocity, i.e., a rotation velocity of the axis is made small.

Furthermore, as in the above description given with reference to FIG. 5, the moment of force M21 may be calculated for use. In other words, when the magnitude of the position vector Pv is smaller than the predetermined value, the moment of force M21 is assumed to be the operation force. In addition, when the magnitude of the position vector Pv is equal to or larger than the predetermined value, the moment of force M12 or a moment of force obtained by adding the moment of force M12 and the moment of force M21 together is assumed to be the operation force. Furthermore, an influence of each of the moments of force M12 and M21 may be adjusted by multiplying each of the moment of force M12 and the moment of force M21 by a coefficient to change the magnitude thereof, and then values obtained by the adjustment of the influences may be added together. In this case, the coefficient may be adjusted on the basis of the magnitude of the position vector Pv, the magnitude of the force Fp, and the like.

Additionally, when calculating a moment of force as described above, there is a problem resulting from change in the magnitude of the calculated moment of force caused depending on the direction of the force Fp even when the magnitude of the force Fp is the same. A method for solving the problem will be described with reference to FIG. 9.

Figure 9:
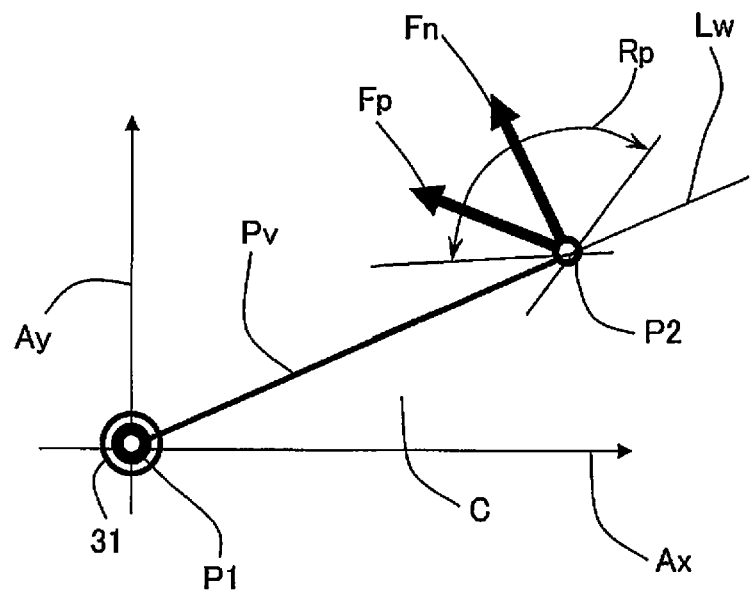
FIG. 9 is a diagram for illustrating another method for calculating an operation force with respect to the operation axis.

FIG. 9 is a diagram for illustrating another method for calculating an operation force with respect to the operation axis 31 on the basis of the force Fs measured by the force measurement unit 21 described as above. In FIG. 9, there is obtained a force including a translational force applied around the rotation center line of the operation axis 31 on the basis of a direction in which a force F of a translational component of a force Fs is applied and a rotation operation of direction into a predetermined direction.

First, as described above, on the basis of the force Fs, a force Fp including a translational force on the plane C is calculated. On the basis of a direction of the calculated force Fp, there is obtained an angle made by the force Fp and the straight line Lw. The calculated angle is compared with a predetermined angle range Rp. When it is determined that the direction of the force Fp is within the predetermined angle range Rp, the force Fp is rotated around the point P2 as a rotation center point so that the direction of the force Fp is a predetermined direction Dn (not depicted in the drawing) as a representative direction, thereby calculating a force Fn. The direction of the force Fn is preferably set to a direction orthogonal to the position vector Pv. A moment of force is calculated from an outer product calculation of the position vector Pn and the force Fn thus obtained, and the calculated moment of force M13 is assumed to be the operation force.

As described above, when obtaining a moment of force, setting the direction of the force Fp applied around the rotation center line of the operation axis 31 to a representative direction determined according to the direction can reduce fluctuation in the moment of force due to fluctuation in the direction of the force Fp, so that fluctuation and radical change in the operation force, and the like can be prevented. Thus, the robot 50 can be stably moved, thereby allowing improvement in operability.

In addition, when obtaining the moving velocity of the operation axis on the basis of operation force and force control gain, it can be prevented that even if the same force is applied, the moving velocity of the operation axis unintentionally varies depending on the direction of the force Fp.

Additionally, the predetermined direction Dn used to rotate the direction of the force Fp may be changed according to the direction of the force Fp. A description will be given of an example of a method for rotating the direction of the force Fp by changing the predetermined direction Dn according to the direction of the force Fp, with reference to FIG. 10.

Figure 10:
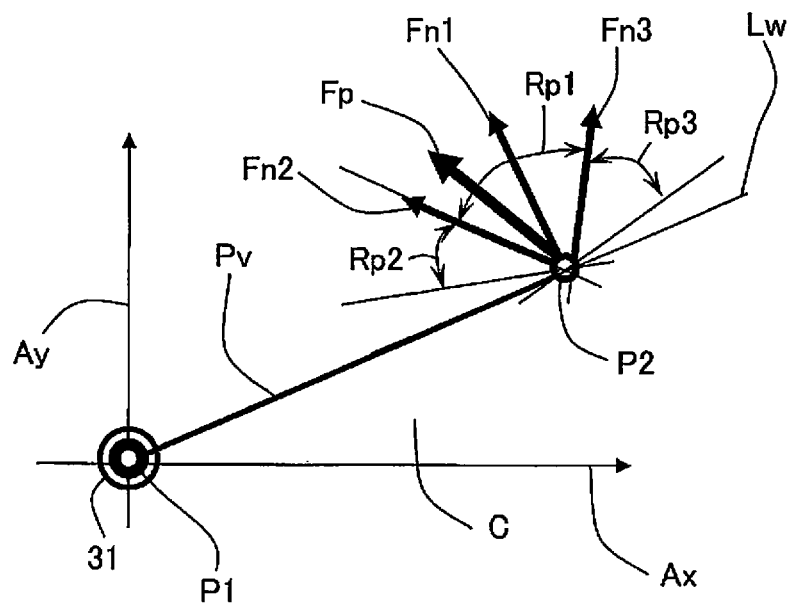
FIG. 10 is a diagram depicting an example of a method for rotating a direction of the force Fp.

As depicted in FIG. 10, ranges different in order, such as ranges Rp1, Rp2, and Rp3, are set as predetermined angular ranges. On the basis of an angle made by the force Fp and the straight line Lw, it is determined which of the angular ranges Rp1, Rp2, and Rp3 includes the direction of the force Fp. On the basis of the predetermined direction Dn set in advance in each range, the direction of the force Fp is rotated around the point P2 as the rotation center point.

For example, when the direction of the force Fp is within the range Rp1, a force Fn1 obtained by rotating the force Fp in the predetermined direction Dn is assumed to be force Fn. When the direction of the force Fp is within the range Rp2, a force Fn2 obtained by rotating the force Fp in another predetermined direction Dn is assumed to be force Fn. Furthermore, when the direction of the force Fp is within the range Rp3, a force Fn3 obtained by rotating the force Fp in still another predetermined direction Dn is assumed to be force Fn. When switching the predetermined direction Dn in stages in each range as described above, it is preferable to smoothly change the direction of the force Fp or smoothly change the calculated moment of force M13 so that the operation force does not significantly change.

In this way, changing the predetermined direction Dn used to rotate the direction of the force Fp in stages in each predetermined range on the basis of the direction of the force Fp allows the moment of force M13 to be changed considering the direction of the force Fp as much as possible. Furthermore, in this case, it is possible to prevent small fluctuation in the moment of force M13 due to fluctuation in the direction of the force Fp occurring when the direction of the force Fp is within any of the predetermined ranges. This can reduce fluctuation in the operation force, so that the robot 50 can be moved more stably and safely to allow improvement in operability.

Additionally, as the magnitude of the position vector Pv becomes larger, the predetermined direction Dn may be changed to a direction in which the angle made by the predetermined direction Dn and the position vector Pv becomes smaller. In this case, along with the increase of the magnitude of the position vector Pv, the predetermined direction Dn is changed to the direction in which the angle made by the predetermined direction Dn and the position vector Pv becomes smaller with respect to the magnitude of the position vector Pv in stages in each predetermined range or in stages according to a predetermined function.

When switching the predetermined direction Dn in stages in each range, it is preferable to smoothly change the direction of the force Fp or smoothly change the calculated moment of force M13 so that operation force does not significantly change.

Thus, the operation force can be made small by reducing the magnitude of the moment of force M13 even when the magnitude of the force Fn is the same, by changing the predetermined direction Dn to the direction in which the angle made by the predetermined direction Dn and the position vector Pv becomes smaller as the magnitude of the position vector Pv becomes larger.

Accordingly, when obtaining the moving velocity of the operation axis on the basis of operation force and force control gain, the moving velocity of the operation axis can be made small when the tip 58 of the robot 50 is distal from the operation axis even though the magnitude of the force Fp is the same. By moving the tip 58 of the robot 50 in the state where the moving velocity, i.e., the rotation velocity of the axis is made small, the operator can move the robot 50 more safely.

Furthermore, as in the above description with reference to FIG. 5, the moment of force M21 may be calculated for use. In other words, when the magnitude of the position vector Pv is smaller than a predetermined value, the moment of force M21 is assumed to be the operation force. In addition, when the magnitude of the position vector Pv is equal to or larger than the predetermined value, the moment of force M13 or a moment of force obtained by adding the moment of force M13 and the moment of force M21 together is assumed to be the operation force. Furthermore, an influence of each of the moment of force M13 and the moment of force M21 may be adjusted by multiplying the each moment of force by a coefficient to change the magnitude of each thereof, and values obtained by the adjustment of the influence may be added together. In this case, the coefficient may be adjusted on the basis of the magnitude of the position vector Pv, the magnitude of the force Fp, and the like.

In addition, a moment of force may be calculated on the basis of the operation of adjusting expansion/contraction of the position vector where the force Fp on the plane C is applied performed upon calculation of the moment of force M12 and the rotation operations into the direction of the force F of the translational component of the force Fs and the predetermined direction performed upon calculation of the moment of force M12.

A description will be given of a practical example of the calculation method with reference to FIG. 11.

Figure 11:
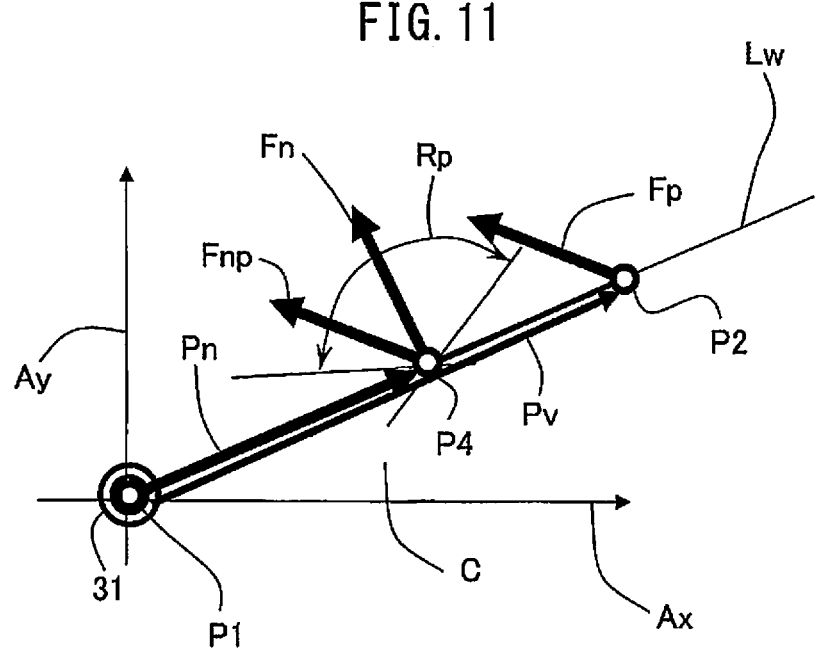
FIG. 11 is a diagram for illustrating another method for calculating an operation force with respect to the operation axis.

FIG. 11 is a diagram for illustrating a method for calculating an operation force with respect to the operation axis 31 on the basis of the force Fs measured by the force measurement unit 21, as in FIGS. 5, 8, 9, 10, and the like.

Similarly to the above description, the point P1 is the origin representing the position of the operation axis 31 on the reference coordinate system. The plane C is assumed to be an X-Y plane, which is a plane formed by the X axis Ax and the Y axis Ay on a coordinate system set at the operation axis 31 such that the origin is positioned at the point P1, the Z axis Az is coincident with the rotation center line of the operation axis 31, and the plane formed by the X axis Ax and the Y axis Ay is a plane orthogonal to the rotation center line of the operation axis 31. The point P2 is assumed to be a point where a force measurement point as an origin of a force measurement coordinate system when measuring a force applied to the tip 58 of the robot 50 is projected on the plane C. The position vector Pv is assumed to be a position vector from the point P1 to the point p2 on the plane C. The force Fp is assumed to be a translational force obtained as a force applied around the rotation center line of the operation axis 31 on the plane C as described above, on the basis of the force F of the translational component of the force Fs. Reference sign Lw is assumed to be a straight line present on the plane C and including the points P1 and P2.

In this case, on the basis of the position vector Pv where the force Fp including the translational force is applied, a position vector Pn is calculated by an expansion/contraction adjustment of the magnitude of the position vector Pv to a predetermined value Cpn. A force obtained by moving the force Fp in parallel such that a point where the force Fp including the translational force is applied is moved to the position P4 as the end point of the position vector Pn is assumed to be a force Fnp.

On the basis of the direction of the force Fnp obtained by moving the force Fp in parallel on the plane C, an angle made by the force Fnp and the straight line Lw is calculated. The calculated angle is compared with the predetermined angular range Rp given by a predetermined angle. When it is determined that the direction of the force Fp is within the predetermined angular range Rp, the force En obtained by rotating the direction of the force Fp in a predetermined direction is calculated.

A moment of force is calculated from an outer production calculation of the position vector Pn and the force Fn thus obtained, and the calculated moment of force M14 is assumed to be the operation force. However, when the magnitude of the position vector Pv is smaller than a predetermined value, the moment of force M21 is assumed to be the operation force, as in the above description.

As described above, the direction of the force Fp applied around the rotation center line of the operation axis 31 is set to a representative direction determined according to the direction. Additionally, the magnitude of the position vector where the force is applied is set to a predetermined magnitude. This can reduce fluctuation in the moment of force due to fluctuation in the position of the point P2 and fluctuation in the direction of the force Fp when obtaining a moment of force. Thus, small fluctuation, radical change, and the like in the operation force can be prevented. Accordingly, the robot 50 can be stably moved, thereby allowing improvement in operability.

Additionally, when obtaining the moving velocity of the operation axis on the basis of operation force and force control gain, it can be prevented that even with application of a force with the same magnitude, the moving velocity of the operation axis unintentionally changes depending on the direction of the force Fp.

In addition, change in the direction of the force Fp, another practical example of the method for setting the magnitude of the position vector where the force Fp is applied to a predetermined value, a method for considering the moment of force M21, and the like are the same as those in the above description. Use of those methods allows improvement in operability for moving the robot 50 by applying a force and allows safer movement of the robot 50.

Another practical example of the operation force calculation method will be described below.

On the basis of the force F of the translational component of the force Fs measured by the force measurement unit 21, there is obtained the force Fp including a translational force applied around the rotation center line of the operation axis 31, and on the basis of a direction of the force Fp including the translational force, there is obtained the direction of the operation force. Alternatively, the magnitude of the operation force may be obtained on the basis of the magnitude of the force F of the translational component of the force Fs measured by the force measurement unit 21 or the magnitude of the force Fp applied around the rotation center line of the operation axis 31.

Figure 12:
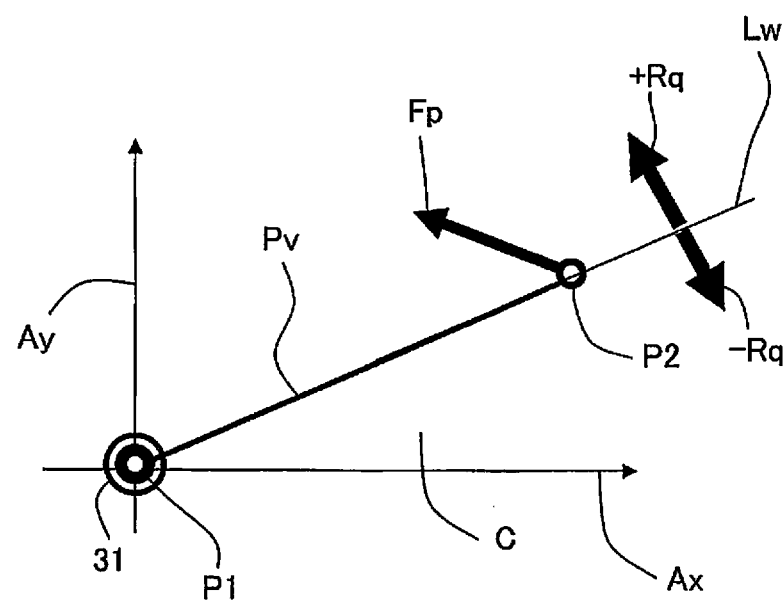
FIG. 12 is a diagram for illustrating another method for calculating an operation force with respect to the operation axis.

The above practical example will be further described with reference to FIG. 12.

Similarly to the above-described practical example, the point P1 is assumed to be the origin representing the position of the operation axis 31 on the reference coordinate system. The plane C is assumed to be an X-Y plane, which is a plane formed by the X axis Ax and the Y axis Ay on the coordinate system set at the operation axis 31 such that the origin is positioned at the point P1, the Z axis Az is coincident with the rotation center line of the operation axis 31, and the plane formed by the X axis Ax and the Y axis Ay is a plane orthogonal to the rotation center line of the operation axis 31. The point P2 is assumed to be a point wherein a force measurement point as an origin of a force measurement coordinate system when measuring a force applied to the tip 58 of the robot 50 is projected on the plane C. The position vector Pv is assumed to be a position vector from the point P1 to the point P2 on the plane C. The force Fp is assumed to be a translational force obtained as a force applied around the rotation center line of the operation axis 31 on the plane C as described above, on the basis of the force F of the translational component of the force Fs. Reference sign Lw is assumed to be a straight line present on the plane C and including the points P1 and P2.

When the magnitude of the position vector Pv is smaller than a predetermined value, the operation force is assumed not to be applied. Then, when the magnitude of the position vector Pv is equal to or larger than the predetermined value, processing will be performed as follows.

First, on the basis of the force Fp, a virtual force assumed to be virtually applied to the operation axis 31 is obtained as follows. For example, by obtaining an inner product of a vector of the force Fp and the position vector Pv, a direction of the virtual force is obtained to determine a sign of the virtual force depending on whether the direction of the force Fp is a positive direction orthogonal to the straight line Lw (a +Rq direction) or a negative direction orthogonal to the straight line Lw (a −Rq direction). In the case depicted in FIG. 12, it is obtained that the direction of the force Fp is the positive direction orthogonal to the straight line Lw (+Rq direction). Accordingly, on the basis of the obtained direction, the direction of the virtual force is assumed to be the positive direction, and the sign of the virtual force is assumed to be positive.

Furthermore, on the basis of the magnitude of the force Fp, or the magnitude of the force F of the translational component of the force Fs is assumed to be the magnitude of the virtual force. Alternatively, a magnitude of a component orthogonal to the position vector Pv of the force Fp may be assumed to be the magnitude of the virtual force. A virtual force Fk thus obtained is assumed to be the operation force.

Furthermore, the moment of force M21 obtained on the basis of the force M of the moment component of the force Fs measured by the force measurement unit 21 may be calculated for use. When the magnitude of the position vector Pv is smaller than the predetermined value, the moment of force M21 is assumed to be the operation force.

In addition, when the magnitude of the position vector Pv is equal to or larger than the predetermined value, a value obtained by multiplying the virtual force Fk by a predetermined value or a moment of force obtained by adding the value obtained by multiplying the virtual force Fk by the predetermined value and the moment of force M21 together is assumed to be the operation force. Furthermore, each of the value obtained by multiplying the virtual force Fk by the predetermined value and the moment of force M21 may be multiplied by a coefficient to change the magnitudes thereof so as to adjust an influence of each thereof. Then, values obtained by the adjustment may be added together. In this case, the coefficient may be adjusted on the basis of the magnitude of the position vector Pv, the magnitude of the force Fp, and the like.

As in the above description, when it is desirable to remove the influence of the force M of a moment component of the force Fs measured by the force measurement unit 21 or it is desirable to move the operation axis only by the translational force of the force Fs, a force based on the virtual force Fk is preferably assumed to be the operation force, without considering the moment of force M21.

The operation command unit 24 moves the operation axis on the basis of the operation force obtained as described above and the moving direction determined according to the direction of the force set by the operation axis setting unit 25. At this time, the operation command unit 24 determines a target moving direction of the operation axis (a rotation direction when the operation axis is a rotation axis), on the basis of a moving direction of the operation force determined according to the sign of the operation force and the direction of the force set by the operation axis setting unit 25, which is here determined according to the sign of the operation force, and calculates a target moving velocity of the operation axis on the basis of the magnitude of the operation force.

In this case, it is preferable to calculate the target moving velocity of the operation axis by performing a force control obtained by multiplying the magnitude of the operation force by a force control gain for determining a movement responsiveness to force. In addition, the force control gain may be changed according to a shortest distance from the rotation center line of the operation axis to the tip 58 of the robot 50.

At this time, the force control gain is changed on the basis of the shortest distance from the rotation center line of the operation axis to the tip 58 of the robot 50, in stages in each predetermined range, in stages according to a predetermined function, or continuously according to the predetermined function. When switching the force control gain in stages, it is preferable to smoothly change the velocity of movement so that the moving velocity of the robot 50 does not suddenly and significantly change.

In this way, responsiveness to the operation force can be changed depending on the position of the tip 58 of the robot 50, whereby the moving velocity of the robot 50 can be adjusted in each region in the space.

Now, consideration will be given to movement of the operation axis at a same angular velocity with respect to a same operation force in situations where the shortest distance from the rotation center line of the operation axis to the tip 58 of the robot 50 is large and where it is small. When the shortest distance is large, the translational velocity of the tip 58 of the robot 50 becomes larger than when the shortest distance is small.

Then, when the position of the tip 58 of the robot 50 is distal from the operation axis, it is safer and easier in operation to make smaller the angular velocity of the operation axis with respect to the operation force than when the position of the tip 58 thereof is close to the operation axis. Accordingly, as the shortest distance from the rotation center line of the operation axis to the tip 58 of the robot 50 becomes larger, the force control gain may be made smaller.

In this way, even when the magnitude of the operation force is the same, the velocity of the tip 58 of the robot 50 can be made smaller as the position of the tip 58 of the robot 50 becomes more distant from the operation axis. As a result, safety of the robot 50 can be increased and operability can be improved.

Additionally, when changing the target moving velocity of the operation axis according to the magnitude of the operation force, even if the magnitude of the operation force is the same, a tangential velocity of the tip 58 of the robot 50 becomes larger as the tip 58 of the robot 50 becomes more distant from the operation axis.

Then, when the operation command unit 24 moves the operation axis on the basis of the operation force obtained as described above and the moving direction determined according to the direction of the force set by the operation axis setting unit 25, the operation command unit 24 obtains, on the basis of the operation force, a target moving direction and a target tangential velocity of the tip 58 of the robot 50 around the rotation center line of the operation axis. Then, the operation command unit 24 may obtain a target moving direction and a target moving velocity of the operation axis on the basis of the target moving direction and the target tangential velocity of the tip 58 of the robot 50 to move the operation axis.

In this way, when the magnitude of the operation force is the same, the tangential velocity of the tip 58 of the robot 50 can be made the same, regardless of the position of the tip 58 thereof. In this case, even when the magnitude of the operation force is the same, the rotation velocity of the operation axis becomes smaller as the tip 58 of the robot 50 becomes more distant from the operation axis.

Additionally, in order to obtain such an effect, when calculating the target moving velocity of the operation axis on the basis of the magnitude of the operation force, the force control gain may be made smaller as the shortest distance from the rotation center line of the operation axis to the tip 58 of the robot 50 becomes larger, as described above. In addition, in order to obtain the above-described effect, when calculating the operation force, reduction calculation may be made by using the shortest distance from the rotation center line of the operation axis to the tip 58 of the robot 50 so that the obtained operation force may be small.

In addition, when obtaining the target moving direction and the target moving velocity of the operation axis after obtaining the moving direction and the tangential velocity of the tip 58 of the robot 50 around the rotation center line of the operation axis on the basis of the operation force, the target tangential velocity of the tip 58 of the robot 50 may be calculated by a force control obtained by multiplying the magnitude of the operation force by a force control gain for determining a movement responsiveness to force. Even in this case, the value of the force control gain may be changed according to the shortest distance from the rotation center line of the operation axis to the tip 58 of the robot 50.

In such a case, the force control gain is changed on the basis of the shortest distance from the rotation center line of the operation axis to the tip 58 of the robot 50, in stages in each predetermined range, in stages according to a predetermined function, or continuously according to the predetermined function. When switching the force control gain in stages, it is preferable to smoothly change the velocity of movement so that the moving velocity of the robot 50 does not suddenly and significantly change.

Additionally, in the above-described case, the force control gain may be made smaller as the shortest distance from the rotation center line of the operation axis to the tip 58 of the robot 50 becomes larger. In this way, as the position of the tip 58 of the robot 50 becomes more distant from the rotation center line of the operation axis, the tangential velocity of the tip 58 of the robot 50 around the rotation center line of the operation axis can be made smaller, as a result of which the robot 50 can be operated more safely.

Thus, the operation command unit 24 outputs a command for moving a desired axis set as the operation axis of the robot 50, on the basis of the setting of the operation axis setting unit 25 and the operation force(s) calculated by the first operation force acquisition unit 22 and/or the second operation force acquisition unit 23.

Thus, when applying a force to the tip of a robot, the robot can be easily moved to any posture by moving a axis of the robot according to the force. In other words, when moving a position and/or a posture of the tip of the robot on an orthogonal coordinate system by moving the robot by application of the force to the tip of the robot, the tip of the robot can be moved to a position to which it is difficult or impossible to move the tip thereof.

In addition, when moving the position of the axis of the robot by applying a force to the tip of the robot, the position of the axis thereof can be moved more stably, more safely, and easily regardless of fluctuation in the position of the tip of the robot and fluctuation in the direction of the force applied to the tip thereof, thereby improving operability.

Advantageous Effects of the Present Invention

The present invention allows a robot to be easily moved to any posture by moving a axis of the robot according to a force when the force is applied to the tip of the robot. In addition, when moving the position of the axis of the robot by applying the force to the tip of the robot, the invention allows the position thereof to be moved more stably, more safely, and easily regardless of fluctuation in the position of the tip of the robot and fluctuation in the direction of the force applied thereto, thereby allowing improvement in operability.

While various embodiments and modifications of the present invention have been described hereinabove, it is obvious to those skilled in the art that the intended function effects of the invention can be achieved also by other embodiments and modifications. In particular, it is possible to remove or replace the elements of the above-described embodiments and modifications, and it is possible to further add a known unit, without departing from the scope of the invention. In addition, it is obvious to those skilled in the art that the invention can be implemented also by arbitrarily combining the features of the plurality of embodiments implicitly or explicitly disclosed herein. In other words, other forms conceivable within the range of the technical idea of the invention are also included within the scope of the invention.

What is claimed is:

1. A robot control device of a robot system for moving a robot, the robot including a plurality of axes including at least one rotation axis, the robot control device comprising:
   a force measurement unit configured to measure a measured force applied to a tip of the robot;
   an operation axis setting unit configured to
      set an axis that is rotationally moved according to the measured force as an operation axis from among the at least one rotation axis, and
      set a rotational moving direction of the operation axis according to a direction of the measured force;
   a first operation force acquisition unit configured to, when a first tip applied force comprises a translational component of the measured force,
      obtain, on the basis of the first tip applied force, a projected force comprising the translational component of the measured force, wherein the projected force is present on a plane orthogonal to a rotation center line of the operation axis and applied around the rotation center line of the operation axis, and
      obtain, on the basis of (i) the projected force and (ii) a position vector where the projected force is applied, a first virtual force that is virtually applied to the operation axis, wherein the first virtual force is a first operation force; and
   an operation command unit configured to output, on the basis of an operation force determined from the first operation force, an operation command for moving the operation axis set by the operation axis setting unit,
   wherein the operation command unit is configured to obtain a target moving direction and a target moving velocity of the operation axis on the basis of (i) the first operation force and (ii) the rotational moving direction set by the operation axis setting unit, so as to move the operation axis.

2. The robot control device according to claim 1, wherein, when the operation command unit obtains the target moving direction and the target moving velocity of the operation axis, the operation command unit is configured to
   obtain a tip target moving direction and a tip target tangential velocity of the tip of the robot around the rotation center line of the operation axis, and
   obtain the target moving direction and the target moving velocity of the operation axis on the basis of (i) the tip target moving direction and (ii) the tip target tangential velocity of the tip of the robot, so as to move the operation axis.

3. The robot control device according to claim 1, wherein the first operation force acquisition unit is configured to calculate a moment component of the projected force on the basis of (i) the projected force and (ii) the position vector where the projected force is applied, so as to obtain a direction and a magnitude of the first operation force.

4. The robot control device according to claim 1, wherein the first operation force acquisition unit is configured to
   obtain an adjusted position vector by adjusting a magnitude of the position vector to a predetermined value, and
   calculate a moment component of the projected force on the basis of (i) the projected force and (ii) the adjusted position vector, so as to obtain a direction and a magnitude of the first operation force.

5. The robot control device according to claim 4, wherein the predetermined value is made smaller as a shortest distance from the rotation center line of the operation axis to the tip of the robot becomes larger.

6. The robot control device according to claim 1, wherein the first operation force acquisition unit is configured to
   obtain the projected force on the basis of (i) a tip applied force direction in which the first tip applied force is applied and (ii) a rotation operation for rotating the tip applied force direction into a predetermined direction, and
   calculate a moment component of the projected force on the basis of (i) the projected force and (ii) the position vector where the projected force is applied, so as to obtain a direction and a magnitude of the first operation force.

7. The robot control device according to claim 6, wherein the predetermined direction is changed to a direction in which an angle made by the predetermined direction and the position vector becomes smaller as a shortest distance from the rotation center line of the operation axis to the tip of the robot becomes larger.

8. The robot control device according to claim 1, wherein the first operation force acquisition unit is configured to
   obtain the projected force on the basis of (i) a tip applied force direction in which the first tip applied force is applied and (ii) a rotation operation for rotating the tip applied force direction into a predetermined direction,
   obtain an adjusted position vector by adjusting a magnitude of the position vector to a predetermined value, and
   calculate a moment component of the projected force on the basis of (i) the projected force and (ii) the adjusted position vector, so as to obtain a direction and a magnitude of the first operation force.

9. The robot control device according to claim 1, wherein the first operation force acquisition unit is configured to
   obtain a direction of the first operation force on the basis of (i) a direction of the projected force and (ii) the position vector where the projected force is applied, and
   obtain a magnitude of the first operation force on the basis of (i) a magnitude of the projected force or (ii) a magnitude of the first tip applied force.

10. The robot control device according to claim 1, wherein the operation command unit is configured to
    obtain a moving velocity of the operation axis by a force control based on a force control gain, and
    make the force control gain smaller as a shortest distance from the rotation center line of the operation axis to the tip of the robot becomes larger.

11. A robot control device of a robot system for moving a robot, the robot including a plurality of axes including at least one rotation axis, the robot control device comprising:
    a force measurement unit configured to measure a measured force applied to a tip of the robot;
    an operation axis setting unit configured to
       set an axis that is rotationally moved according to the measured force as an operation axis from among the at least one rotation axis, and
       set a rotational moving direction of the operation axis according to a direction of the measured force;
    a second operation force acquisition unit configured to, when a second tip applied force comprises a moment component of the measured force, obtain, on the basis on the second tip applied force, a second virtual force that is virtually applied to the operation axis, wherein the second virtual force is a second operation force; and
    an operation command unit configured to output, on the basis of an operation force determined from the second operation force, an operation command for moving the operation axis set by the operation axis setting unit, wherein the operation command unit is configured to obtain a target moving direction and a target moving velocity of the operation axis on the basis of (i) the second operation force and (ii) the rotational moving direction set by the operation axis setting unit, so as to move the operation axis.

12. The robot control device according to claim 11, wherein, when the operation command unit obtains the target moving direction and the target moving velocity of the operation axis, the operation command unit is configured to obtain a tip target moving direction and a tip target tangential velocity of the tip of the robot around a rotation center line of the operation axis, and obtain the target moving direction and the target moving velocity of the operation axis on the basis of (i) the tip target moving direction and (ii) the tip target tangential velocity of the tip of the robot, so as to move the operation axis.

13. The robot control device according to claim 11, wherein the second operation force acquisition unit is configured to calculate a moment component of a force that is applied around a rotation center line of the operation axis based on the second tip applied force, so as to obtain a direction and a magnitude of the second operation force.

14. A robot control device of a robot system for moving a robot, the robot including a plurality of axes including at least one rotation axis, the robot control device comprising:

a force measurement unit configured to measure a measured force applied to a tip of the robot;

an operation axis setting unit configured to set an axis that is rotationally moved according to the measured force as an operation axis from among the at least one rotation axis, and set a rotational moving direction of the operation axis according to a direction of the measured force;

a first operation force acquisition unit configured to, when a first tip applied force comprises a translational component of the measured force, obtain, on the basis of the first tip applied force, a projected force comprising the translational component of the measured force, wherein the projected force is present on a plane orthogonal to a rotation center line of the operation axis and applied around the rotation center line of the operation axis, and obtain, on the basis of (i) the projected force and (ii) a position vector where the projected force is applied, a first virtual force that is virtually applied to the operation axis, wherein the first virtual force is a first operation force;

a second operation force acquisition unit configured to, when a second tip applied force comprises a moment component of the measured force, obtain, on the basis on the second tip applied force, a second virtual force that is virtually applied to the operation axis, wherein the second virtual force is a second operation force; and an operation command unit configured to output, on the basis of (i) an operation force determined from the first operation force and (ii) the second operation force, an operation command for moving the operation axis set by the operation axis setting unit, wherein the operation command unit is configured to obtain a target moving direction and a target moving velocity of the operation axis on the basis of (i) the first operation force, (ii) the second operation force, and (iii) the rotational moving direction set by the operation axis setting unit, so as to move the operation axis.

* * * * *